Oct. 25, 1966 W. S. DRAKE 3,280,575
LIQUEFIED GAS STORAGE SYSTEM
Filed May 20, 1965 2 Sheets-Sheet 1

INVENTOR.
William S. Drake
BY Paul J. Cook
Agent

INVENTOR.
William S. Drake
BY
Agent

United States Patent Office 3,280,575
Patented Oct. 25, 1966

3,280,575
LIQUEFIED GAS STORAGE SYSTEM
William S. Drake, Los Angeles, Calif., assignor to Mobil Oil Corporation, a corporation of New York
Filed May 20, 1965, Ser. No. 457,271
10 Claims. (Cl. 62—54)

This invention relates to a system for storing liquefiable gases. More particularly, this invention relates to a system for storing liquefiable gases wherein the gas is liquefied through the use of a combination of temperature control and pressure control means.

At the present time, liquefiable gases can be stored in apparatus having refrigeration systems associated therewith which employ either temperature controls or pressure controls. In presently used storage facilities, liquefiable gas is stored in liquid phase in a large tank which may or may not be highly insulated. Since these storage facilities are in contact with outside weather conditions, which may cause conversion of the liquid to vapor, it is sometimes necessary to provide auxiliary heat exchange equipment which is capable of liquefying the vapors formed within and withdrawn from the storage facility. The vapors are directed to a refrigeration system to become liquefied and the resultant liquefied gas is recycled to the storage tank. It is the usual practice to operate the refrigeration equipment intermittently rather than continuously and in present systems they can be activated automatically depending either upon the vapor pressure or the liquid temperature in the liquid storage tank.

When a storage tank which is not capable of withstanding relatively high vapor pressure is employed, the heat exchange equipment associated therewith cools the vapors to form liquid in order to control the vapor pressure within preset limits. This type of system, although only requiring a relatively low cost storage tank, require high capacity heat exchange equipment to cool the incoming liquid which is relatively costly. Alternatively, when the storage tank which is employed is capable of withstanding high vapor pressure no heat exchange equipment or insulation is usually required. This type of system suffers from the disadvantage or requiring a structurally strong storage tank which is of relatively high cost.

When temperature control is used as a means for activating the auxiliary heat exchange equipment, the desirable flexibility and accurate control of the storage system can be lost, depending on the material stored. This is due to the fact that the temperature of the stored liquefiable gas varies depending upon its location in the system; that is, the liquid temperature in the storage tank is different from the vapor temperature at the heat exchange equipment. Thus, in a temperature controlled system, even though a relatively large amount of liquid has become vaporized, the heat exchange equipment may not become activated because the liquid in the tank at the temperature sensing location has not risen to a sufficiently high temperature. Vapor temperature also is an inaccurate measure of the amount of vapor which must be condensed to maintain system conditions within the preset limits because of the change in liquid volume in the storage tank and accompanying changes in vapor volume during periods of continuous use.

On the other hand, pressure control is a relatively easy method for controlling tank conditions but is not always an accurate measure of the amount of liquid which has vaporized. Considerable deviation will occur with non-ideal fluids such as butane. Pressure control can be used conveniently as a means for activating the heat exchange equipment, but suffers from the disadvantage of relatively high cost refrigeration capacity which may be unnecessary. In addition, since the gas which has been liquefied by the heat exchange equipment is usually recycled to the storage tank, the temperature therein may become rapidly lowered upon contact with the recycled liquid. The heat exchange equipment can remain in operation even though the liquid temperature is lowered because the vapor pressure change resulting from the liquid temperature change is not instantaneous and the vapor space pressure has not been sufficiently reduced to inactivate the heat exchange equipment. In this manner, an undesirably low temperature in the storage tank will be attained. Further, undesirably low liquid temperatures can result from the influences of outside weather. In either case, the low temperature may cause the shell material of the storage equipment to become undesirably brittle resulting in increased suspectibility to rupturing of the same. Since the changes in vapor pressure in the system are determined in part by elevations and friction losses in the piping and equipment and are not instantaneous when the liquid temperature is lowered, a pressure controlled system must provide either high capacity heat exchange equipment or structurally stronger storage tanks than is actually necessary, depending upon the type of pressure control system employed. This is due to the fact that a certain amount of time is necessary for the pressure to become equalized to the lower pressure throughout the system.

It is an object of the present invention to provide a liquefiable gas storage system which minimizes the costs of storage tank construction and heat exchange equipment.

It is a further object of the present invention to provide a liquefiable gas storage system which controls the system conditions within desired limits accurately and quickly.

It is a further object of the present invention to provide a liquefiable gas storage system which is both safe and flexible.

The present invention provides for a liquefied gas storage system having storage facilities and heat exchange facilities which are controlled by means responsive to a preset storage pressure range and a minimum storage temperature which temperature responsive means override the pressure responsive means. When the vapor pressure in the primary storage facility rises above the preset maximum pressure, the heat exchange equipment will be automatically activated by a pressure control which is responsive to the primary storage facility vapor pressure in order to liquefy the vapors formed therein. The liquefied vapors which are formed in the heat-exchange equipment are then circulated back to the primary storage facility. The noncondensables are purged from the system during the operation by directing liquid and gas from the heat-exchange equipment to an accumulator tank wherein gas and liquid are first separated and then individually removed. When the temperature of the liquid in the primary storage facility becomes lower than the preset minimum due to the low temperature liquid being recirculated thereto even though the vapor pressure within the system is higher than the preset maximum, the heat exchange equipment will be deactivated by the temperature control which is responsive to the liquid storage temperature and which overrides the pressure control.

In accordance with the present invention, a liquefiable gas, as for example liquefiable petroleum gases such as butane, propane, or ethane, or liquefiable gases such as ammonia, carbon dioxide, hydrogen fluoride, chlorine, fluorochloroethanes, and the like, is directed in a confined stream to a primary storage tank until the desired amount is stored therein. The liquefiable gases are chilled by flashing upon entering the primary storage tank. Thus, a precooler or chiller is not required on the incoming stream to the primary storage tank. When the vapor pressure in the primary storage tank exceeds a preset maximum level, a refrigeration unit which has a condenser associated therewith is activated by a control which is responsive to said pressure. The condenser which has a refrigerant cycled thereto is in heat-exchange relationship with the overhead vapors from the storage tank and effects substantial condensation of the vapors to liquid when the refrigeration unit is in operation. The liquefied gas and non-liquefied gas are directed in a confined stream to an accumulator tank wherein the liquid forms a lower phase and the vapors form an upper phase. The vapors in the accumulator tank are those which are lighter and non-condensable in the system employed. When the vapors in the primary storage tank exert a certain maximum preset pressure, gas-purging means, such as a compressor, is activated by a pressure control responsive to said vapor pressure in order to remove the noncondensable gases from the accumulator tank. The liquefied gas in the accumulator tank is recycled to the primary storage tank. When the temperature in the primary storage tank falls below a preset minimum, the refrigeration unit is deactivated by a temperature control even though the vapor pressure therein is within the preset operating range.

In accordance with another embodiment of the present invention, the vapors formed in the primary storage tank can be directed to a plurality of condensers, each of which are associated with a refrigeration unit and which are in parallel relationship. The vapors from the primary storage tank can be liquefied in more than one condenser. In such an arrangement, the first refrigeration unit is activated by a pressure control which is preset to correspond to the maximum desirable storage tank vapor pressure. The remaining refrigeration unit or units have a preset activation pressure which is somewhat higher as well as a preset cut-off pressure which is higher than the first refrigeration unit. Thus, when the refrigeration units are in operation, the second refrigeration unit will be activated by a pressure control when the vapor pressure in the primary storage tank is above the preset activation pressure of the first refrigeration unit and the vapors passing through the condensers associated therewith will be liquefied. The same principle is followed for any subsequent refrigeration unit in the system. The second refrigeration unit has a higher preset cut-off pressure than the first refrigeration unit. Each additional refrigeration unit in the system, when such a system is employed, will have higher preset activation and cut-off pressure than the next preceding activated refrigeration unit and will operate in the same manner as described above for the first and second refrigeration units. The liquefied gases produced in the condensers can then be combined in a single stream or can be directed as a plurality of streams to an accumulator tank. In the accumulator tank, vapor and liquid are separated with the vapor forming the upper phase. The liquid is then recycled to the primary storage tank and the noncondensables are purged in a manner described above.

Accordingly, the pressure and temperature controls which can be employed in the process of the present invention are adapted to sense liquid temperature and vapor pressure in the liquid storage tank and to control activation or deactivation of the heat exchange equipment. Any type of controls so adapted, can be employed as for example, controls which activate or deactivate the heat exchange equipment through the transmission of electrical impulse, pneumatic force or mechanical force. In one embodiment of the present invention, a pneumatic system is employed. A transmitter which is adapted to measure either temperature or pressure is placed at the desired location. The transmitter produces a pneumatic output signal which is proportionate to the pressure or temperature. The resultant pneumatic signal then activates or deactivates the heat exchange equipment control depending upon the strength of the signal. As stated above, the temperature sensing device is adapted so that the signal therefrom overrides the signal from the pressure sensing device at conditions of low liquid temperature. The process of this invention can be adapted for any liquefiable gases by presetting the sensing devices so that the signals therefrom will be sufficiently strong to promote refrigeration unit activation or deactivation only at the desired temperature and pressure. The desired liquid storage temperature and pressure will depend upon many factors of which the most important are the critical temperature and pressure for the particular liquefiable gas stored.

In a more particular aspect of the present invention, each of the embodiments described above are provided with additional features which promote ease of control, flexibility and safety. When the vapor pressure in the storage tank is so high that the heat exchange equipment cannot liquefy a sufficient amount of gas to bring the storage conditions within the preset storage levels, either or both an automatic bleed-off valve which is up-stream of the first condenser can be employed or the introduction of liquefiable gas into the storage tank can be automatically diminished or stopped. The bleed-off valve is positioned upstream of the first condenser and downstream of the primary storage tank and is preset to be automatically opened when the system vapor pressure is above a predetermined value. The gas which is removed from the system through this valve can be stored in an area outside the system and can be later cycled to the system as desired or it can be flared. Further, when the system vapor pressure is too high, a valve which is responsive to the primary storage tank vapor pressure can be employed to automatically diminish or completely shut off the incoming streams of liquefiable gas to the first storage tank.

In liquefied gas storage systems, it is desirable to provide for the protection against the effects of low temperature as for example caused by outside weather conditions or by failure of pressure control deactivating means. If not effectively controlled, low storage temperatures can lead to increased metal brittleness or solidification of the liquefied gas. It is within the scope of the present invention to provide an auxiliary heating means which assist in maintaining storage tank temperatures above an undesirable minimum. The use of the heating means also permits relatively rapid liquid withdrawal rates from the storage tank. This heating can be accomplished either by indirect heat exchange with the tank or by indirect heat exchange with a stream of liquid withdrawn from the storage tank and recycled thereto. This heating can be commenced either manually or automatically. When the heating is commenced automatically, means which are responsive to temperature in the tank are connected to and adapted to activate or deactivate the heating means which is attached to the tank. Similarly, when it is desired to employ a heating means in indirect heat-exchange relationship with a confined stream of liquid which is removed from the first storage tank, the activation of the heating means can be accomplished either manually or automatically. The liquid can be removed from the tank by any convenient means, as for example by pumping or by normal convection. The liquid is then brought into indirect heat-exchange relationship with a heater, as for example a steam heater, and then recycled, in a heated condition, to the storage tank.

Aside from temperature and pressure control, it is also desirable to maintain the liquid level in the storage tank in order to prevent problems resulting from overflowing. The liquid level is maintained through the use of a sensing device located at a particular level in the storage tank. When the liquid rises to the maximum desirable level, the sensing device transmits a signal which closes a valve which is positioned to control the flow of incoming liquefied gas. The level of liquid is then reduced by either withdrawing it for use or by natural evaporation. Similarly, level controls are maintained on the accumulator tank which collects the cooled gas and liquid obtained from the refrigeration equipment. A separate activation level control is associated with each pump employed to cycle liquid back to the storage tank. Each level activation control on the accumulator tank is adapted to activate the pump associated therewith and is activated when the liquid rises to a predetermined level. The pumps remove the liquid from the accumulator tank until the liquid has reached a predetermined low level where a pump deactivation control is located. The low level control is usually adapted to deactivate each pump rather than having an individual low level control for each pump.

Reference is now made to the attached drawing for a more detailed explanation of the present invention. For purposes of convenience, operating conditions will be explained for butane as the liquefiable gas. This is not to be interpreted as limiting the present invention as applying only to butane, but serves merely as a vehicle for explaining the essence of the invention.

Figure 1:
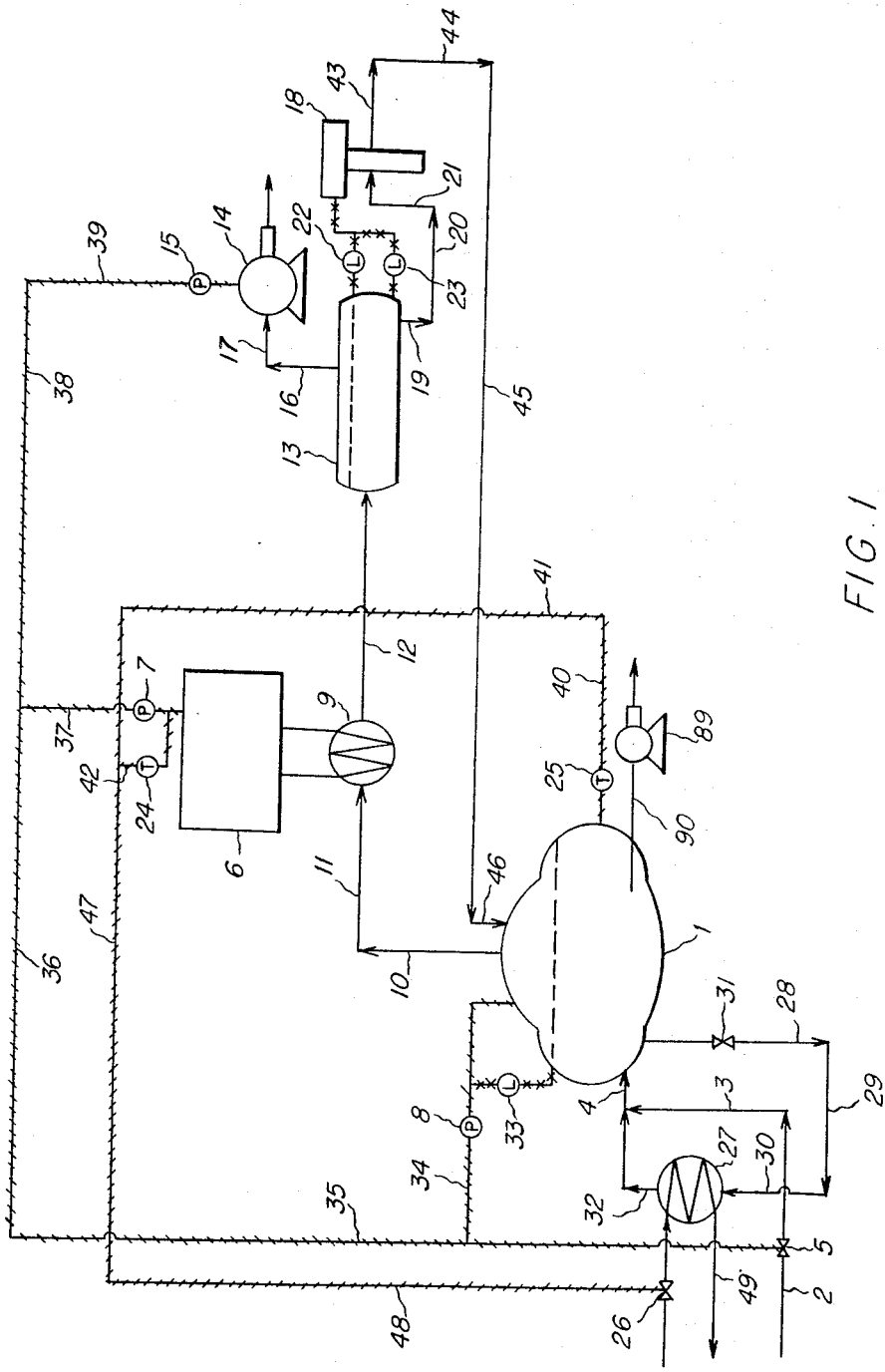
FIGURE 1 is a schematic diagram of the system of the present invention wherein one heat exchange unit is employed.

Referring now to FIGURE 1, liquid butane is introduced into an insulated liquid storage tank 1 through conduits 2, 3, and 4 at a rate within the limits of the refrigeration capacity and outside weather conditions. The flow rate through conduits 2, 3 and 4 is usually in the range of from about 500 to about 1,000 barrels per day and is normally not limited by valve 5 which is normally open. A portion of the incoming liquid butane is flashed in storage tank 1 in order to cool it to the storage temperature. Storage tank 1 has a capacity of about 50,000 barrels of liquid and is capable of withstanding a maximum pressure of about 15 p.s.i.g. The liquid butane is usually maintained in a temperature range of from about 48° F. to about 60° F. and a pressure of from about 10 to about 14 p.s.i.g. in storage tank 1. When the vapor pressure in storage tank 1 exceeds about 12 p.s.i.g. due to increased temperature therein, a compressor motor in refrigeration unit 6 will be automatically activated by pressure control 7 which is in turn controlled by pressure control 8. Pressure control 8 measures the vapor pressure in storage tank 1 and when the pressure therein exceeds about 12 p.s.i.g., a pneumatic signal of sufficient strength is transmitted therefrom through lines 34, 35, 36 and 37 to pressure control 7 which activates the compressor in refrigeration unit 6. Refrigeration unit 6 will be deactivated in a like manner when the butane vapor pressure in storage tank 1 is about 10 p.s.i.g. Refrigeration unit 6 is in communication with condenser 9 which is in turn in indirect heat exchange relationship with the overhead butane vapors leaving storage tank 1. The butane vapors are directed from storage tank 1 by conduits 10 and 11 at a rate of about 1500 pounds per hour into condenser 9 wherein cooling occurs. At condenser 9, when refrigeration unit 6 is activated, refrigerant is directed from refrigeration unit 6 in a cooled condition to condenser 9 and substantially all of the butane vapors become liquefied. Heat exchange in the condenser is from condensing butane vapors to boiling refrigerant. The condensed butane liquid is then directed from condenser 9 through conduit 12, at a flow rate of about 5 gallons per minute, to an insulated accumulator tank 13. The temperature in accumulator tank 13 is maintained in the range of from about 32° F. to about 60° F. while the vapor pressure is usually slightly lower than the vapor pressure in storage tank 1. When the vapor pressure in the primary storage tank 1 exceeds about 14 p.s.i.g., a non-condensable purge compressor 14 will be activated by pressure control 15, which is responsive to a signal from pressure control 8, which in turn measures the vapor pressure in storage tank 1. Pressure control 8 directs a pneumatic signal through lines 34, 35, 36, 38 and 39 to pressure control 15, which is proportionate to the pressure in storage tank 1 with pressure control 15 being deactivated at about 9 p.s.i.g. The vapors from accumulator tank 13 are evacuated therefrom through conduits 16 and 17 by the non-condensables purge compresser 14 and are stored or employed as desired.

The butane liquid in accumulator tank 13 is pumped therefrom to storage tank 1 by pump 18 through conduits 19, 20, 21, 43, 44, 45 and 46. Pump 18 is activated by a pneumatic signal from level control 22 and reactivated by a pneumatic signal from level control 23, both of which are responsive to the liquid level in accumulator tank 13. When the vapor pressure in storage tank 1 is greater than about 10 p.s.i.g. after the refrigeration unit 6 is activated, but the liquid temperature is below about 50° F. due to the incoming recycled liquid, refrigeration unit 6 will be deactivated. The deactivation, which is dependent upon temperature in storage tank 1, is accomplished by temperature control 24 which overrides the pressure control 7 on refrigeration unit 6. Temperature control 25 is responsive to the butane liquid temperature in storage tank 1 and controls temperature control 24, which is adapted to automatically deactivate refrigeration unit 6. The temperature control 25 operates in the same general manner as pressure control 8. The pneumatic signal is transmitted from temperature control 25 through lines 40, 41 and 42 to temperature control 24 which operates to deactivate a compressor motor in refrigeration unit 6 and the signal therefrom overrides the signal from pressure control 8. Further, when the liquid temperature in storage tank 1 falls below about 48° F., temperature control 25 will automatically cause control valve 26 to open by a pneumatic signal sent through lines 40, 41, 47 and 48 and permit steam to enter heat exchange unit 27. When the liquid storage temperature is below about 48° F., liquid butane will exit from storage tank 1 by gravity flow through conduits 28, 29 and 30 when valve 31 is open and pass in indirect heat-exchange relationship with the steam in heat exchange unit 27. In the heat exchange unit 27, the liquid butane is partially vaporized. The steam condensate is exited from heat exchange unit 27 through conduit 49. The heated butane re-enters storage tank 1 through conduits 32 and 4. When the pressure in storage tank 1 rises above about 14.5 p.s.i.g., pressure control 8 will automatically close control valve 5 to prevent further incoming butane from entering. In addition the high level controller 33 will also automatically close control valve 5 when the maximum desired liquid level in storage tank 1 is reached. When it is desired to remove liquid butane from storage tank 1, it is withdrawn by pump 89 through conduit 90.

Figure 2:
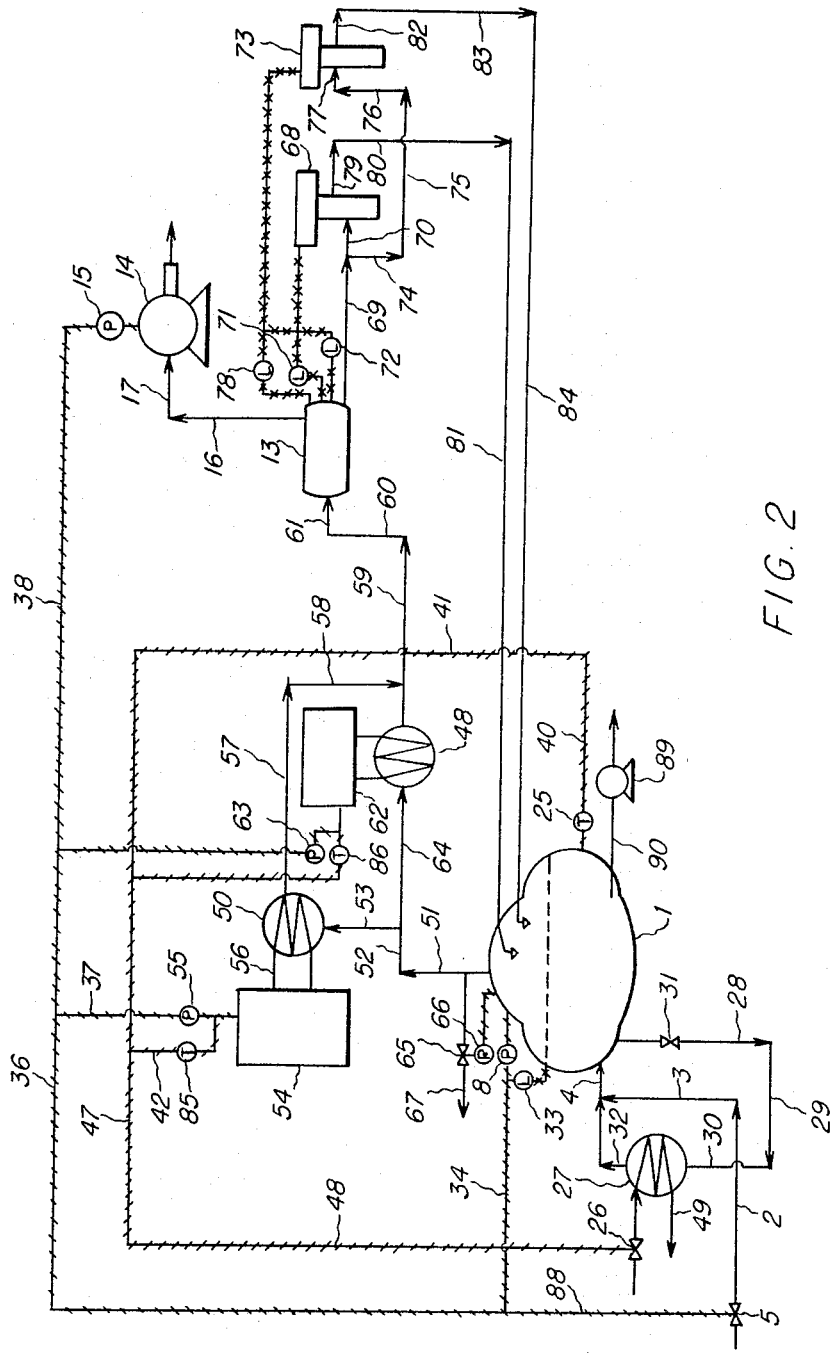
FIGURE 2 is a schematic diagram of the system of the present invention wherein a plurality of heat exchange units are employed as well as means employed for relatively high vapor pressures in the system.

Referring now to FIGURE 2, incoming butane enters an insulated liquefied gas storage tank 1 through conduits 2, 3 and 4. The maximum flow rate of incoming butane is dependent upon the incoming butane temperature, weather conditions, and amount of liquid butane already stored therein and is usually from about 500 to about 1,000 barrels per day. Storage tank 1 is adapted to withstand a maximum pressure of about 15 p.s.i.g., and has a capacity of about 50,000 barrels. The butane therein exists both in liquid phase and vapor phase, and is maintained at a temperature of from about 48° F. to about 60° F. When it is desired to remove liquid butane from storage tank 1, it is withdrawn by pump 89 through conduit 90. Due to outside weather conditions, the temperature inside storage tank 1 will change. When there is a temperature increase therein, more butane is vaporized and the vapor pressure is increased. The vapors are withdrawn from storage tank 1 to condenser 50 through conduits 51, 52 and 53. When the vapor pressure in storage tank 1 exceeds about 12 p.s.i.g., refrigeration unit 54 is automatically activated by pressure control 55 which is responsive to pressure control 8. Pressure control 8 is directly responsive to the butane vapor pressure in storage tank 1. When refrigeration unit 54 is activated, cooled refrigerant is cycled therefrom through conduit 56 to condenser 50 wherein refrigerant and butane are in indirect heat-exchange relationship, and heat is transferred from condensing butane vapor to boiling refrigerant. The condensed butane is then directed from condenser 50 to an accumulator tank 13 through conduits 57, 58, 59, 60 and 61. When the butane vapor pressure in storage tank 1 exceeds about 13 p.s.i.g., refrigeration unit 62 is automatically activated by pressure control 63, which is responsive to pressure control 8 and a portion of the butane vapor will pass to condenser 48 through conduit 64. The liquefied butane obtained in a manner as described for condenser 50 is then directed from condenser 48 to accumulator tank 13 through conduits 59, 60 and 61. Refrigeration unit 54 is automatically deactivated by pressure control 55 when the vapor pressure in storage tanke 1 is less than about 10 p.s.i.g., and refrigeration unit 62 is automatically deactivated by pressure control 63 when the vapor pressure in storage tank 1 is less than about 11 p.s.i.g. Each refrigeration unit has a capacity of about 20 tons.

When the vapor pressure in storage tank 1 exceeds about 14.5 p.s.i.g., pressure control valve 65 which is responsive to a pneumatic signal from pressure control 66 which in turn measures the vapor pressure in storage tank 1, will automatically open. The vapor is exited through conduit 67 to a flare, not shown, in order to quickly diminish the pressure in storage tank 1. Control valve 65 is automatically closed by a pneumatic signal from control 66 when the vapor pressure in the storage tank falls below about 14.5 p.s.i.g.

The butane in accumulator tank 13 exists in both vapor and liquid phase at a temperature of about 50° F. and at a vapor pressure of from about 10 p.s.i.g. to 11 p.s.i.g. When the vapor pressure in storage tank 26 exceeds about 14 p.s.i.g., purge compresser 14 is activated by pressure control 15, which is responsive to pressure control 8 which in turn measures the vapor pressure in storage tank 1. The vapors from accumulator tank 13 are evacuated therefrom through conduits 16 and 17 and are stored or employed as desired. The compresser 14 is deactivated by pressure control 15 when the vapor pressure in shorage tank 1 falls below about 9 p.s.i.g.

Liquid butane is withdrawn from accumulator tank 13 by pump 68 through conduits 69 and 70. The pump 68 is activated when the liquid level in accumulator tank 13 exceeds a preset maximum by a pneumatic signal from level control 71 and is deactivated by a pneumatic signal from level control 72 when the liquid level falls below a preset minimum. When there is excess liquid in accumulator tank 13 which cannot be accommodated by pump 68, a portion of the liquid is withdrawn by pump 73 through conduits 74, 75, 76 and 77. Pump 73 is activated by a pneumatic signal from level control 78 and is deactivated by a pneumatic signal from level control 72. The liquid butane is recycled to storage tank 1 from pump 68 through conduits 79, 80 and 81 and from pump 73 through conduits 82, 83 and 84. The liquid butane is recycled to storage tank 1 in an amount of from about 10 to about 30 g.p.m. When the liquid butane temperature falls below 50° F., the compressers in refrigeration units 54 and 62 will be deactivated even though the vapor pressure in storage tank 1 exceeds about 12 p.s.i.g. Temperature control 25 measures the liquid temperature in the storage tank 1 and is adapted to send pneumatic signals to temperature controls 85 and 86. Temperature control 85 automatically deactivates the compresser in refrigeration unit 54 while temperature control 86 deactivates the compresser in refrigeration unit 62 upon a signal from temperature control 25.

When the temperature of the liquid butane in storage tank 1 falls below 48° F., the temperature thereof can be increased to the desired temperature of 50° F. Temperature control 25 controls valve 26 so that steam is permitted to enter heat exchange unit 27 when the liquid storage temperature is undesirably low. Liquid butane is permitted to flow through conduits 28, 29 and 30 to heat exchange unit 27 so that it is in indirect heat-exchange relationship with the steam. The heated butane is then cycled to storage tank 1 through conduits 32 and 4. Control valve 5 is a further safety feature. When the vapor pressure in storage tank 1 exceeds about 14.5 p.s.i.g., pressure control 8 sends a pneumatic signal through lines 34 and 88 which closes valve 5 to shut off incoming butane.

Having fully described the invention, I claim:

1. The system for storing a liquefiable gas in liquid phase comprising a storage tank, means for filling said storage tank with liquefiable gas in liquid phase, refrigeration means adapted to condense vapors withdrawn from said storage tank, said refrigeration means having automatic pressure activating and deactivating means, said pressure activating and deactivating means being preset to a desired vapor pressure range in said storage tank and responsive thereto, automatic temperature deactivating means associated with said refrigeration means being preset to a desired temperature in said storage tank and responsive thereto, said temperature deactivating means adapted to override said pressure activating and deactivating means, and means to recycle said condensed vapors to said storage tank.

2. The system for storing a liquefiable gas in liquid phase, comprising a storage tank, means for filling said storage tank with liquefiable gas in liquid phase, a plurality of refrigeration means in parallel relationship adapted to condense vapors withdrawn from said storage tank, said refrigeration means each having automatic pressure activating and deactivating means being preset to a desired vapor pressure range and being responsive to the vapor pressure in said storage tank, each refrigeration unit having a lower activating preset pressure and lower deactivating preset pressure than the adjacent succeeding refrigeration unit with the range defined by the deactivating pressure of the first activated refrigeration unit and the activating pressure of the last activated refrigeration unit corresponding to the desired pressure range in the storage tank, temperature deactivating means associated with each of said refrigeration units being preset to a desired temperature in said storage tank and responsive thereto, said temperature deactivating means adapted to override said pressure activating and deactivating means, and means to recycle said condensed vapors to said storage tank.

3. The system for storing a liquefiable gas in liquid phase, comprising a storage tank, means for filling said storage tank with liquefiable gas in liquid phase, refrigeration means adapted to condense vapors withdrawn from said storage tank, said refrigeration means having automatic pressure activating and deactivating means being preset to a desired vapor pressure range in said storage tank and responsive thereto, automatic temperature deactivating means associated with said refrigeration means being preset to a desired temperature in said storage tank and responsive thereto, said temperature deactivating means adapted to override said pressure activating and deactivating means, means to recycle said condensed vapors to said storage tank, and a temperature control means responsive to said storage tank temperature, wherein said temperature control means is adapted at preset temperature to activate and deactivate heating means for heating liquid in said storage tank.

4. The system for storing a liquefiable gas in liquid phase, comprising a storage tank, means for filling said storage tank with liquefiable gas in liquid phase, a plurality of refrigeration means in parallel relationship adapted to condense vapors withdrawn from said storage tank, said refrigeration means each having automatic pressure activating and deactivating means, said pressure activating and deactivating means being preset to a desired vapor pressure range and being responsive to the vapor pressure in said storage tank, each refrigeration unit having a lower activating preset pressure and lower deactivating preset pressure than the adjacent succeeding refrigeration unit with the range defined by the deactivating pressure of the first activated refrigeration unit, and the activating pressure of the last activated refrigeration unit corresponding to the desired pressure range in the storage tank, temperature deactivating means associated with each of said refrigeration units being preset to a desired temperature in said storage tank and responsive thereto, said temperature deactivating means adapted to override said pressure activating and deactivating means, means to recycle said condensed vapors to said storage tank, and a temperature control means responsive to said storage tank temperature wherein said temperature control means is adapted at preset temperatures to activate and deactivate heating means for heating liquid in said storage tank.

5. The system for storing a liquefiable gas in liquid phase, comprising a storage tank, means for filling said storage tank with liquefiable gas in liquid phase, refrigeration means adapted to condense vapors withdrawn from said storage tank, said refrigeration means having automatic pressure activating and deactivating means, said pressure activating and deactivating means being preset to a desired vapor pressure range in said storage tank and responsive thereto, automatic temperature deactivating means associated with said refrigeration means being preset to a desired temperature in said storage tank and responsive thereto, said temperature deactivating means adapted to override said pressure activating said deactivating means, means to recycle said condensed vapors to said storage tank, and pressure control means responsive to said storage tank vapor pressure wherein said pressure control means at a preset pressure which is higher than said refrigeration unit activating pressure is adapted to permit withdrawal of vapors from the storage tank to the atmosphere.

6. The system for storing a liquefiable gas in liquid phase, comprising a storage tank, means for filling said storage tank with liquefiable gas in liquid phase, a plurality of refrigeration means in parallel relationship adapted to condense vapors withdrawn from said storage tank, said refrigeration means each having automatic pressure activating and deactivating means, said pressure activating and deactivating means being preset to a desired vapor pressure range and being responsive to the vapor pressure in said storage tank, each refrigeration unit having a lower activating preset pressure and lower deactivating preset pressure than the adjacent succeeding refrigeration unit with the range defined by the deactivating pressure of the first activated refrigeration unit and the activating pressure of the last activated refrigeration unit corresponding to the desired pressure range in the storage tank, temperature deactivating means associated with each of said refrigeration units being preset to a desired temperature in said storage tank and responsive thereto, said temperature deactivating means adapted to override said pressure activating and deactivating means, means to recycle said condensed vapors to said storage tank, and pressure control means responsive to said storage tank vapor pressure wherein said pressure control means at a preset pressure which is higher than said refrigeration unit activating pressure is adapted to permit withdrawal of vapors to the atmosphere.

7. The system for storing a liquefiable gas in liquid phase, comprising a storage tank, means for filling said storage tank with liquefiable gas in liquid phase, refrigeration means adapted to condense vapors withdrawn from said storage tank, said refrigeration means having automatic pressure activating and deactivating means, said pressure activating and deactivating means being preset to a desired vapor pressure range in said storage tank and responsive thereto, automatic temperature deactivating means associated with said refrigeration means being preset to a desired temperature in said storage tank and responsive thereto, said temperature deactivating means adapted to override said pressure activating means, means to recycle said condensed vapors to said storage tank, and pressure control means responsive to said storage tank vapor pressure wherein said pressure control means at a preset pressure which is higher than said refrigeration unit activating pressure is adapted to cause the rate of liquid flow to said storage tank to diminish.

8. The system for storing a liquefiable gas in liquid phase, comprising a storage tank, means for filling said storage tank with liquefiable gas in liquid phase, a plurality of refrigeration means in parallel relationship adapted to condense vapors withdrawn from said storage tank, said refrigeration means each having automatic pressure activating and deactivating means, said pressure activating and deactivating means being preset to a desired vapor pressure range and being responsive to the vapor pressure in said storage tank, each refrigeration unit having a lower activating preset pressure and lower deactivating preset pressure than the adjacent succeeding refrigeration unit with the range defined by the deactivating pressure of the first activated refrigeration unit and the activating pressure of the last activated refrigeration unit corresponding to the desired pressure range in the storage tank, temperature deactivating means associated with each of said refrigeration units being preset to a desired temperature in said storage tank and responsive thereto, said temperature deactivating means adapted to overide said pressure activating and deactivating means, means to recycle said condensed vapors to said storage tank, and pressure control means responsive to said storage tank vapor pressure wherein said pressure control means at a preset pressure which is higher than said refrigeration unit activating pressure is adapted to cause the rate of liquid flow to said storage tank to diminish.

9. The system for storing a liquefiable gas in liquid phase comprising a storage tank, means for filling said storage tank with liquefiable gas in liquid phase, refrigeration means adapted to condense vapors withdrawn from said storage tank, said refrigeration means having automatic pressure activating and deactivating means, said pressure activating and deactivating means being preset to a desired vapor pressure range in said storage tank and responsive thereto, automatic temperature deactivating means associated with said refrigeration means being preset to a desired temperature in said storage tank and responsive thereto, said temperature deactivating means adapted to override said pressure activating and deactivating means, means to separate condensed vapors and noncondensable vapor, means to recycle said condensed vapors to said storage tank, and pressure control means responsive to said storage tank vapor pressure wherein said pressure control means at a preset pressure which is higher than said refrigeration unit activating pressure is adapted to activate pumping means to purge said noncondensable vapors from the storage system.

10. The system for storing a liquefiable gas in liquid phase, comprising a storage tank, means for filling said storage tank with liquefiable gas in liquid phase, a plurality of refrigeration means in parallel relationship adapted to condense vapors withdrawn from said storage tank, said refrigeration means each having automatic pressure activating and deactivating means, said pressure activating and deactivating means being preset to a desired vapor pressure range and being responsive to the vapor pressure in said storage tank, each refrigeration unit having a lower activating preset pressure and lower deactivating preset pressure than the adjacent succeeding refrigeration unit with the range defined by the deactivating pressure of the first activated refrigeration unit and the activating pressure of the last activated refrigeration unit corresponding to the desired pressure range in the storage tank, temperature deactivating means associated with each of said refrigeration units being preset to a desired temperature in said storage tank and responsive thereto, said temperature deactivating means adapted to override said pressure activating and deactivating means, means to separate condensed vapors and non-condensable vapors to said storage tank, and pressure control means responsive to said storage tank vapor pressure wherein said pressure control means at a preset pressure which is higher than said refrigeration unit activating pressure is adapted to activate pumping means to purge said non-condensable vapors from the storage system.

References Cited by the Examiner
UNITED STATES PATENTS

| | | | |
|---|---|---|---|
| 2,550,886 | 5/1951 | Thompson | 62—54 |
| 2,959,928 | 11/1960 | Maker | 62—54 |
| 2,976,695 | 3/1961 | Meade | 62—54 |
| 3,150,495 | 9/1964 | Reed | 62—54 |
| 3,210,953 | 10/1965 | Reed | 62—54 |

LLOYD L. KING, *Primary Examiner.*

UNITED STATES PATENT OFFICE
CERTIFICATE OF CORRECTION

Patent No. 3,280,575　　　　　　　　　　　　　October 25, 1966

William S. Drake

It is hereby certified that error appears in the above numbered patent requiring correction and that the said Letters Patent should read as corrected below.

Column 6, line 15, for "reactivated" read -- deactivated --; column 7, line 22, for "tanke" read -- tank --; line 47, for "shorage" read -- storage --.

Signed and sealed this 12th day of September 1967.

(SEAL)
Attest:

ERNEST W. SWIDER　　　　　　　　　　　　　EDWARD J. BRENNER
Attesting Officer　　　　　　　　　　　　　　　Commissioner of Patents